Oct. 23, 1923.

R. T. KINGSFORD 1,471,851

ARMATURE WINDING

Filed May 15, 1920

2 Sheets-Sheet 1

INVENTOR.
Russell T. Kingsford
BY Cornelius D. Ehret
his ATTORNEY.

Oct. 23, 1923.

R. T. KINGSFORD

ARMATURE WINDING

Filed May 15, 1920

1,471,851

2 Sheets-Sheet 2

INVENTOR.
Russell T. Kingsford
BY Cornelius D. Ehret
his ATTORNEY.

Patented Oct. 23, 1923.

1,471,851

UNITED STATES PATENT OFFICE.

RUSSELL T. KINGSFORD, OF PHILADELPHIA, PENNSYLVANIA, ASSIGNOR TO ATWATER KENT MANUFACTURING COMPANY, OF PHILADELPHIA, PENNSYLVANIA, A CORPORATION OF PENNSYLVANIA.

ARMATURE WINDING.

Application filed May 15, 1920. Serial No. 381,546.

*To all whom it may concern:*

Be it known that I, RUSSELL T. KINGSFORD, a citizen of the United States, residing in the city and county of Philadelphia, State of Pennsylvania, have invented certain new and useful Improvements in Armature Windings, of which the following is a specification.

My invention relates to armature windings for dynamo-electric machines.

It is the object of my invention to provide an armature winding, more particularly for a dynamo-electric generator such as is driven by an internal combustion engine of a motor vehicle for charging the battery thereof, which shall at once be simple, cheap in production, and practically symmetrical, both electrically and mechanically, and without any dead coil or coils.

To these ends I have devised a winding for a slotted core structure having always an odd number of coil sides per slot, and an even number of slots; the number of coils employed being odd when a wave or series winding is required, and even for a lap or parallel winding.

Figure 1:
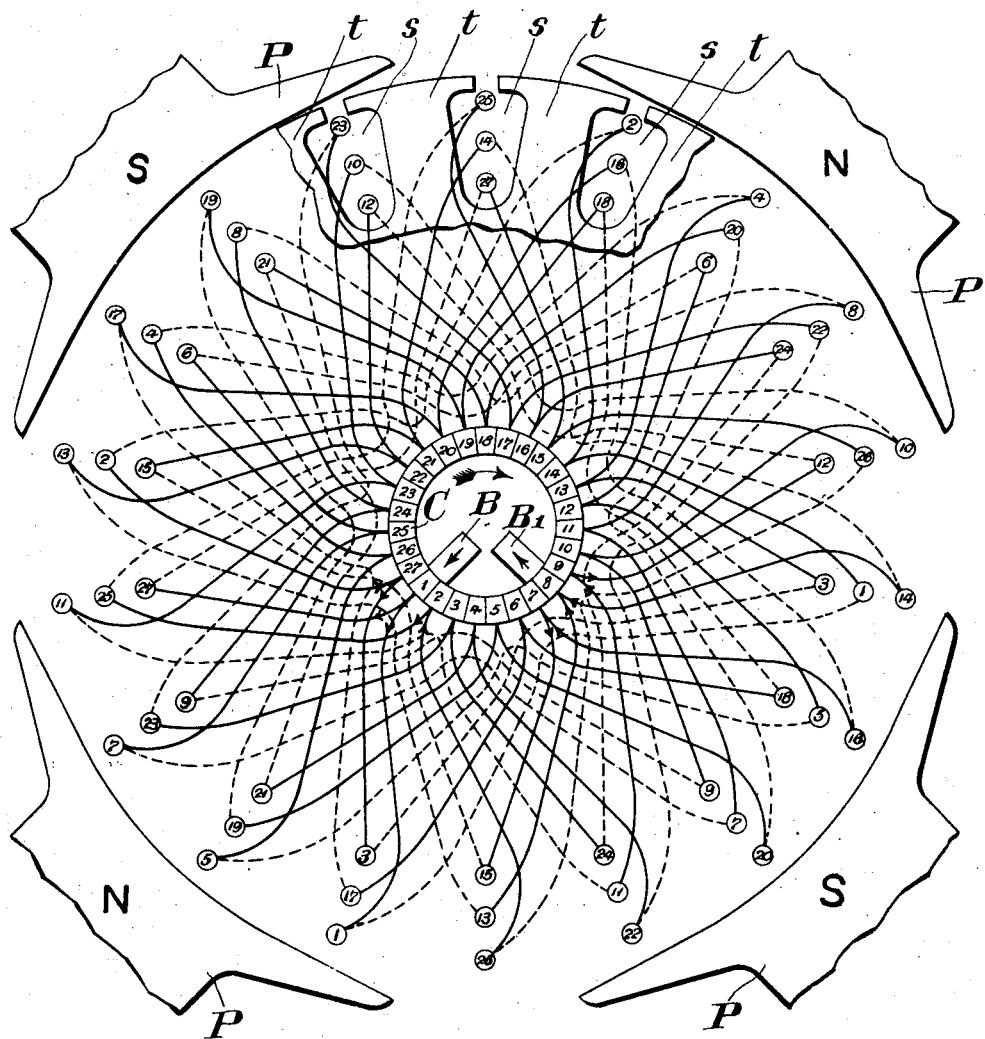
Figure 2:
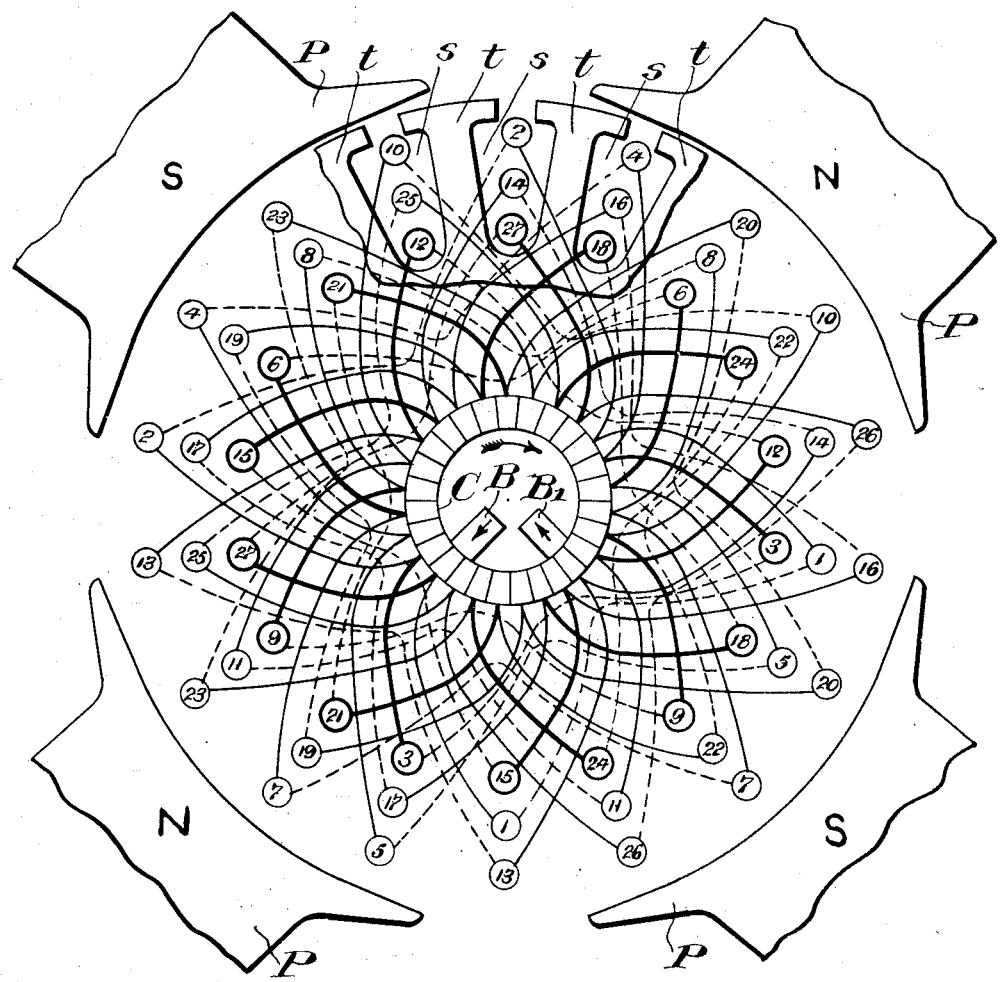

For some of the various forms my invention may take, reference is to be had to the accompanying drawings, in which Fig. 1 is a diagrammatic representation of the field and armature, the latter having a winding embodying my invention, and Fig. 2 is a similar view of a modified form of winding.

Referring to Fig. 1, there are four field poles P, alternately north and south poles, as indicated by N and S.

Within the field rotates an armature comprising a laminated core structure having slots *s* intervening between teeth *t*.

The small circles numbered 1 to 27 inclusive represent the sides of coils each having one or any suitable number of turns or convolutions. There is an odd number of coil sides per slot, three in the example illustrated. The number of coils is odd, twenty-seven in the example illustrated, and the number of coils is an odd multiple of the number of coil sides per slot, the number of slots being twice the number of coils divided by the number of coil sides per slot, this number being, in the example illustrated, eighteen.

At the center of the diagram is indicated the commutator C upon which bear the brushes B and B¹, of carbon, graphite or other suitable material or combination of materials. The full lines from the small numbered circles indicate the path of winding from the front or commutator end, while the dotted lines indicate the cross connections or paths on the rear end of the armature.

The coils may be separately formed, of one or any suitable number of turns or convolutions, and the coils then placed in position in the slots by applying them in various possible orders of sequence.

Or the winding may be accomplished by machine, as by mounting the armature core structure in a lathe, whereby it may be suitably rotated and moved to facilitate the application of the winding.

As indicated in the diagram, the winding illustrated is of the series or wave form and comprises an odd number of coils for a four-pole field. By employing an odd number of coil sides per slot, greater than two per slot, the number of slots is diminished, producing a cheaper structure which is mechanically in balance without employment of idle or dead coils, and which is also substantially electrically symmetrical. It is characteristic of my winding that a certain proportion of the coils, in number equal to half the number of slots, must have an odd pitch; and the remainder of the coils may have the same or a different pitch, either odd or even. The first mentioned coils are symmetrically disposed around the armature, so that there is one of their coil sides in each slot. In the diagram these coils are numbered 3, 6, 9, 12, 15, 18, 21, 24, 27, and their pitch is odd, to wit, five slots. The pitch of the remaining eighteen coils is also shown as five slots, but may be four or other number of slots, if desired. These last coils are symmetrically disposed on the armature with respect to the first mentioned coils, and the connections at the commutator are such that the two sets of coils are symmetrically interleaved, operating as a single winding.

In the example illustrated both sides of the nine coils enumerated lie at the bottoms of the slots, while of the remaining eighteen coils, one side of each is at the top of a slot while the other sides of the same coils are mid-way in the slots. This feature, however, is not essential to my invention, but is illustrative of a suitable mode of applying the winding. A further feature resides in the fact that the second sides of coils whose first sides are disposed in a common slot are, at least two of them, disposed in a common slot, and the remainder differently positioned.

In Fig. 2 there is shown a form of winding of the character hereinbefore referred to and constituting a modification, in which coils, in number equal to half the number of slots, have an odd pitch, while the remainder of the coils have an even pitch. In this example, nine coils have a pitch of five slots and the remaining eighteen coils have a pitch of four slots.

By way of another example, the first nine coils, those separately enumerated, may be applied in such wise that a coil starts in a slot one back of the slot in which the preceding coil ends; and the remaining eighteen coils may be applied in such wise that a coil starts two slots ahead of the slot in which the preceding coil ends.

It is not necessary, however, that the winding be applied in two parts, as both kinds of coils may, if desired, be applied at the same time.

In the case of a lap winding, in which case as many brushes as poles would be necessary, there being that many armature circuits, the number of coils will be even, being an even multiple of the number of coil sides per slot and the number of coil sides per slot will again be an odd number greater than two. For example, there may be thirty coils, three coil sides per slot, and twenty slots, and the pitch, for a four-pole winding, must be for ten of the coils, an odd number of slots, such as five; the pitch of the remaining twenty coils being the same or not, as desired.

It will be understood that although only a four-pole winding is shown, similar windings may be made for any multi-polar design, the pitch of the coils being, as with all windings, always approximately equal to the pole pitch.

What I claim is:

1. An armature comprising a core structure having slots, and a winding comprising an odd number of coil sides per slot, greater than two, and coils whose number is a multiple of said odd number, the second sides of coils whose first sides are disposed in a common slot being divided among a plurality of different slots.

2. An armature comprising a core structure having an even number of slots, and a multipolar series winding comprising an odd number of coil sides per slot, greater than two, an odd number of coils of a number which is a multiple of said odd number, and the pitch of some of the coils, in number equal to half the number of slots, being an odd number of slots..

3. An armature comprising a core structure having an even number of slots, and a multipolar series winding comprising an odd number of coil sides per slot, greater than two, and an odd number of coils of a number which is a multiple of said odd number, the pitch of some of the coils, in number equal to half the number of slots, being an odd number of slots.

4. An armature comprising a core structure having slots, and a winding comprising an odd number of coil sides per slot, greater than two, and an odd number of coils which is a multiple of the number of coil sides per slot, the second sides of coils whose first sides are disposed in a common slot being divided among a plurality of different slots.

5. An armature comprising a core structure having slots, and a multipolar series winding comprising an odd number of coil sides per slot, greater than two, and coils whose number is a multiple of said odd number, the second sides of coils whose first sides are disposed in a common slot being divided among a plurality of different slots.

6. An armature comprising a core structure having slots, and a winding comprising an odd number of coil sides per slot, greater than two, and coils whose number is a multiple of said odd number, the second sides of coils whose first sides are disposed in a common slot being disposed, at least two of them, in a common slot and the remainder differently positioned.

7. An armature comprising a core structure having an even number of slots, and a series winding comprising an odd number of coil sides per slot, greater than two, and an odd number of coils whose number is a multiple of the number of coil sides per slot, the second sides of coils whose first sides are disposed in a common slot being disposed, at least two of them, in a common slot and the remainder differently positioned.

8. An armature comprising a core structure having slots, and a winding comprising an odd number of coil sides per slot, greater than two, and coils of a number which is a multiple of said odd number, the pitch of some of the coils, in number equal to half the number of slots, being an odd number of slots, the second sides of coils whose first sides ar disposed in a common slot being divided among a plurality of different slots.

9. An armature comprising a core structure having slots, and a winding comprising an odd number of coil sides per slot, greater than two, and coils of a number which is an odd multiple of said odd number, the pitch of some of the coils, in number equal to half the number of slots, being an odd number of slots, the second sides of coils whose first sides are disposed in a common slot being divided among a plurality of different slots.

10. An armature comprising a core structure having slots, and a winding comprising an odd number of coil sides per slot, greater than two, and coils of a number which is a multiple of said odd number, the pitch of some of the coils, in number equal to half the number of slots, being an odd number of slots, and the pitch of others of the coils being a different number of slots.

11. An armature comprising a core structure having slots, and a winding comprising an odd number of coil sides per slot, greater than two, and coils of a number which is a multiple of said odd number, the pitch of some of the coils, in number equal to half the number of slots, being an odd number of slots, and the pitch of others of the coils being an even number of slots.

12. An armature comprising a core structure having an even number of slots, and a multipolar series winding comprising an odd number of coil sides per slot, greater than two, and an odd number of coils which is an odd multiple of the number of coil sides per slot, and the pitch of some of the coils, in number equal to half the number of slots, being an odd number of slots.

13. An armature comprising a core structure having slots, and a multi-polar series winding comprising an odd number of coils, the number of slots being twice the number of coils divided by an odd integer, greater than two, said odd integer representing the number of coil sides per slot, the pitch of some of the coils, in number equal to half the number of slots, being an odd number of slots.

14. An armature comprising a core structure having eighteen slots, and a four-pole series winding comprising twenty-seven coils, and three coil sides per slot, with an odd pitch.

In testimony whereof I have hereunto affixed my signature this 13th day of May, 1920.

RUSSELL T. KINGSFORD.